(12) United States Patent
Cacciaguera

(10) Patent No.: US 9,738,379 B2
(45) Date of Patent: Aug. 22, 2017

(54) REMOVABLE LIFT ASSEMBLY FOR A ROTORCRAFT, AND A ROTORCRAFT

(71) Applicant: AIRBUS HELICOPTERS, Marignane (FR)

(72) Inventor: Bruno Cacciaguera, Greasque (FR)

(73) Assignee: AIRBUS HELICOPTERS, Marignane (FR)

( * ) Notice: Subject to any disclaimer, the term of this patent is extended or adjusted under 35 U.S.C. 154(b) by 245 days.

(21) Appl. No.: 14/675,985

(22) Filed: Apr. 1, 2015

(65) Prior Publication Data

US 2015/0284076 A1    Oct. 8, 2015

(30) Foreign Application Priority Data

Apr. 7, 2014  (FR) .................................... 14 00836

(51) Int. Cl.
| | |
|---|---|
| *B64C 27/22* | (2006.01) |
| *B64C 27/26* | (2006.01) |
| *B64C 27/32* | (2006.01) |
| *B64C 1/26* | (2006.01) |
| *B64C 3/18* | (2006.01) |

(52) U.S. Cl.
CPC .............. *B64C 27/26* (2013.01); *B64C 1/26* (2013.01); *B64C 3/185* (2013.01); *B64C 27/32* (2013.01); *B64C 2211/00* (2013.01)

(58) Field of Classification Search
None
See application file for complete search history.

(56) References Cited

U.S. PATENT DOCUMENTS

| | | | | |
|---|---|---|---|---|
| 1,703,621 A | * | 2/1929 | Alvah .................. | B64C 23/005 244/7 R |
| 2,063,030 A | * | 12/1936 | Crouch .................. | B64C 3/385 244/201 |
| 3,105,659 A | * | 10/1963 | Stutz ...................... | B64C 27/26 244/17.19 |
| 3,258,228 A | * | 6/1966 | Crook ..................... | B64D 5/00 244/2 |

(Continued)

FOREIGN PATENT DOCUMENTS

| | | |
|---|---|---|
| EP | 2690011 | 1/2014 |
| FR | 1507306 | 12/1967 |

(Continued)

OTHER PUBLICATIONS

French Search Report for FR 1400836, Completed by the French Patent Office on Nov. 18, 2014, 6 Pages.

*Primary Examiner* — Medhat Badawi
(74) *Attorney, Agent, or Firm* — Brooks Kushman P.C.

(57) ABSTRACT

A lift assembly that is releasably fastened to a fuselage of a rotorcraft. The lift assembly comprises a wing comprising at least two spars. A main gearbox passes through an opening in the suction side of a central box of the wing so that its bottom is attached to a resilient suspension system arranged level with the pressure side of the central box, a top of the main gearbox projecting from the central box and being fastened to at least one spar by at least three suspension bars. A reversible fastener system having a plurality of fastener means serves to fasten the central box reversibly to a plurality of fastener points of a fuselage.

20 Claims, 4 Drawing Sheets

(56) References Cited

U.S. PATENT DOCUMENTS

| | | | | |
|---|---|---|---|---|
| 3,288,421 A * | 11/1966 | Peterson | ............... | B23Q 1/5462 108/4 |
| 3,385,537 A * | 5/1968 | Lichten | ................... | B64C 27/26 244/17.13 |
| 3,448,946 A * | 6/1969 | Nagatsu | ................... | B64C 27/12 244/17.19 |
| 3,502,290 A * | 3/1970 | Legrand | ................ | B64C 27/001 244/17.27 |
| 3,516,624 A * | 6/1970 | Crook | .................... | B64C 17/00 244/2 |
| 8,328,129 B2 * | 12/2012 | Smith | ..................... | B64C 27/12 244/17.11 |
| 8,336,811 B2 * | 12/2012 | Cazals | ....................... | B64C 1/26 244/2 |
| 8,720,824 B2 * | 5/2014 | Martinez Fernandez | . | B64C 1/26 244/123.1 |
| 2001/0005814 A1 * | 6/2001 | Dussac | .............. | G10K 11/1788 702/56 |
| 2002/0011539 A1 * | 1/2002 | Carter, Jr. | ................ | B64C 27/02 244/6 |
| 2003/0098389 A1 * | 5/2003 | Dussac | ..................... | F16F 7/01 244/17.27 |
| 2004/0001754 A1 * | 1/2004 | Levallard | ................ | B64C 27/35 416/107 |
| 2005/0151001 A1 * | 7/2005 | Loper | ..................... | B64C 27/14 244/6 |
| 2008/0149759 A1 * | 6/2008 | Walliser | .................... | B64C 27/30 244/17.11 |
| 2009/0032638 A1 * | 2/2009 | Zhao | ....................... | B64C 27/16 244/6 |
| 2009/0321554 A1 * | 12/2009 | Roesch | ................... | B64C 27/26 244/6 |
| 2010/0065677 A1 * | 3/2010 | Ferrier | .................... | B64C 27/26 244/6 |
| 2010/0132915 A1 * | 6/2010 | Blanding | ............. | B64D 13/006 165/41 |
| 2011/0114798 A1 * | 5/2011 | Gemmati | ................ | B64C 27/26 244/7 R |
| 2011/0155841 A1 * | 6/2011 | Cranga | ................. | B64C 27/001 244/17.11 |
| 2011/0266398 A1 * | 11/2011 | Voss | ........................ | B64C 1/26 244/45 R |
| 2013/0062467 A1 * | 3/2013 | Soenarjo | ................... | B64C 1/26 244/123.1 |
| 2013/0270415 A1 * | 10/2013 | Lee | ........................... | F16F 7/00 248/638 |
| 2014/0061367 A1 * | 3/2014 | Fink | ....................... | B64C 39/068 244/6 |
| 2014/0209744 A1 * | 7/2014 | Marcoe | ................... | B64C 3/185 244/123.1 |
| 2014/0263836 A1 * | 9/2014 | Guillemaut | ............... | B64C 1/26 244/131 |
| 2014/0361121 A1 * | 12/2014 | Cominsky | ................ | B64C 1/26 244/131 |
| 2015/0004348 A1 * | 1/2015 | Zuardy | ................... | B32B 38/08 428/76 |
| 2015/0139800 A1 * | 5/2015 | Hendricks | ............... | F16F 15/10 416/134 A |
| 2015/0166187 A1 * | 6/2015 | Durbin | .................. | B64D 13/08 62/79 |
| 2015/0308534 A1 * | 10/2015 | Smith | ...................... | B64C 27/001 188/378 |
| 2015/0369944 A1 * | 12/2015 | Miles | ....................... | G01V 3/16 324/331 |
| 2016/0009366 A1 * | 1/2016 | Marks | ....................... | B64C 1/06 244/123.1 |
| 2017/0001724 A1 * | 1/2017 | Yates | ..................... | B64C 39/024 |

FOREIGN PATENT DOCUMENTS

| | | |
|---|---|---|
| FR | 2935351 | 3/2010 |
| GB | 673421 | 6/1952 |
| GB | 895590 | 5/1962 |
| RU | 2448866 | 4/2012 |

* cited by examiner

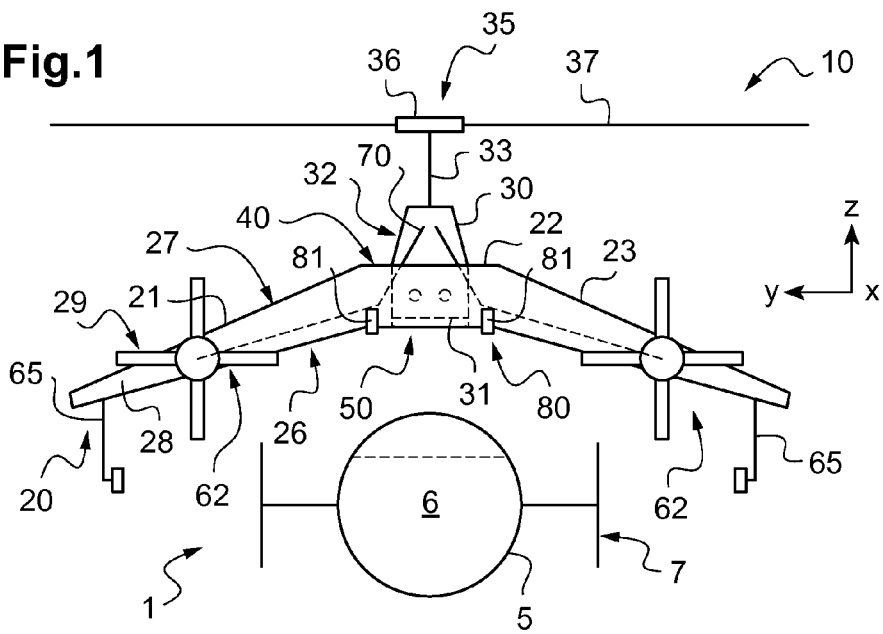
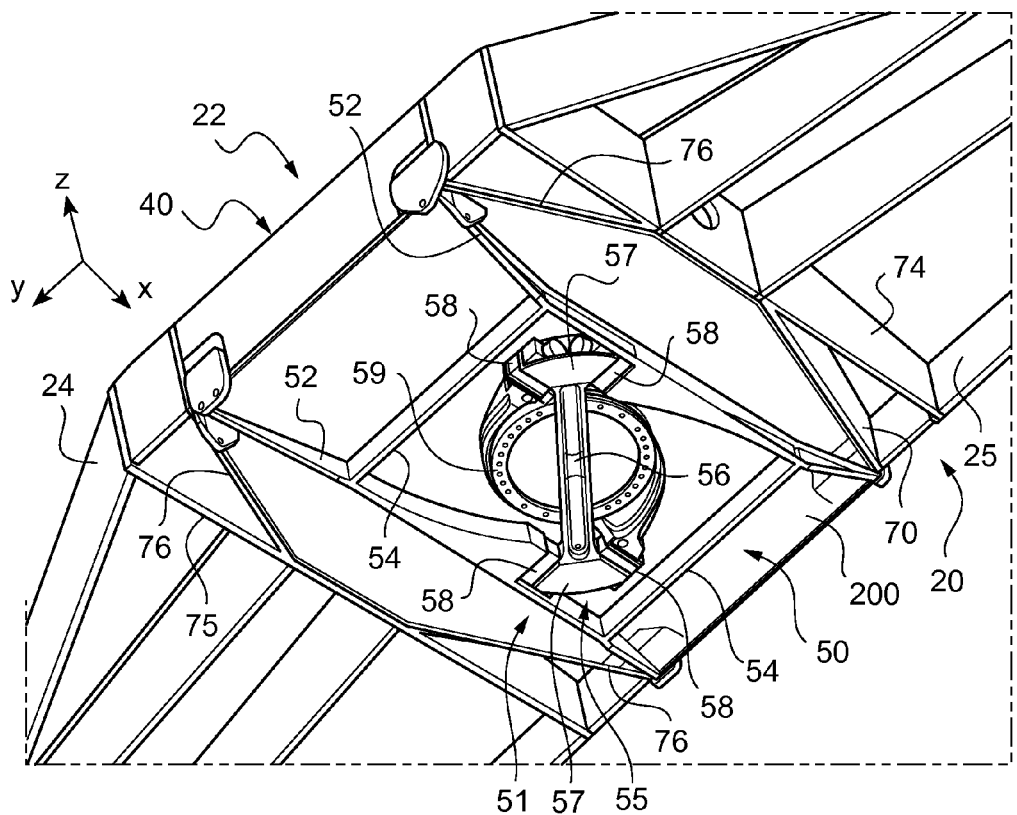

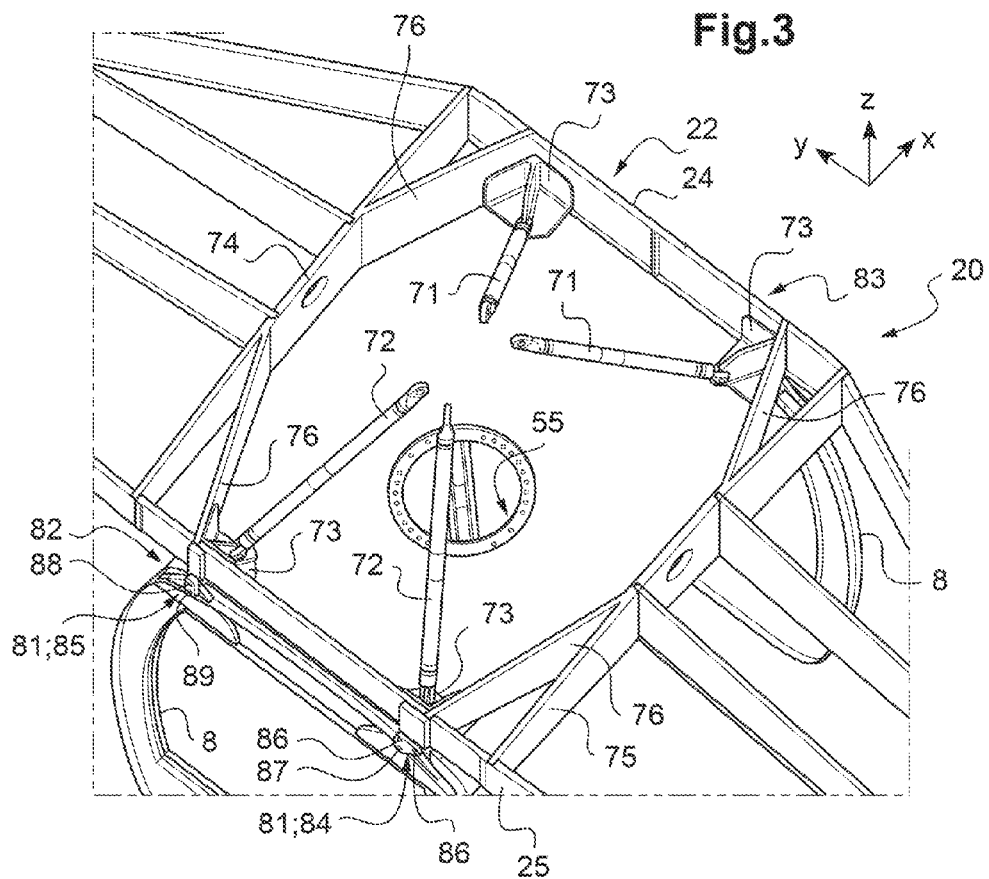
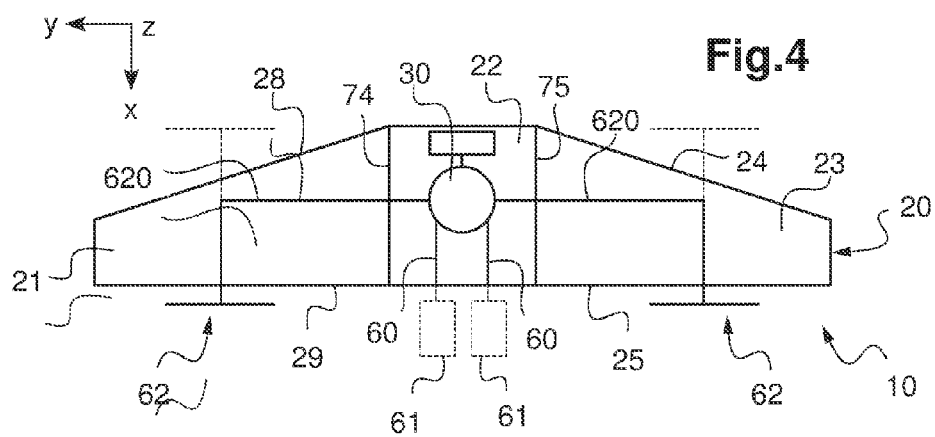

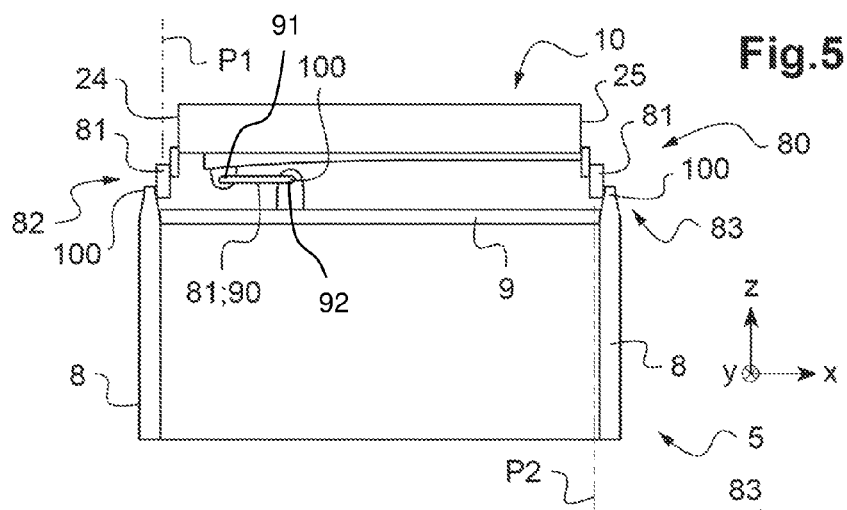
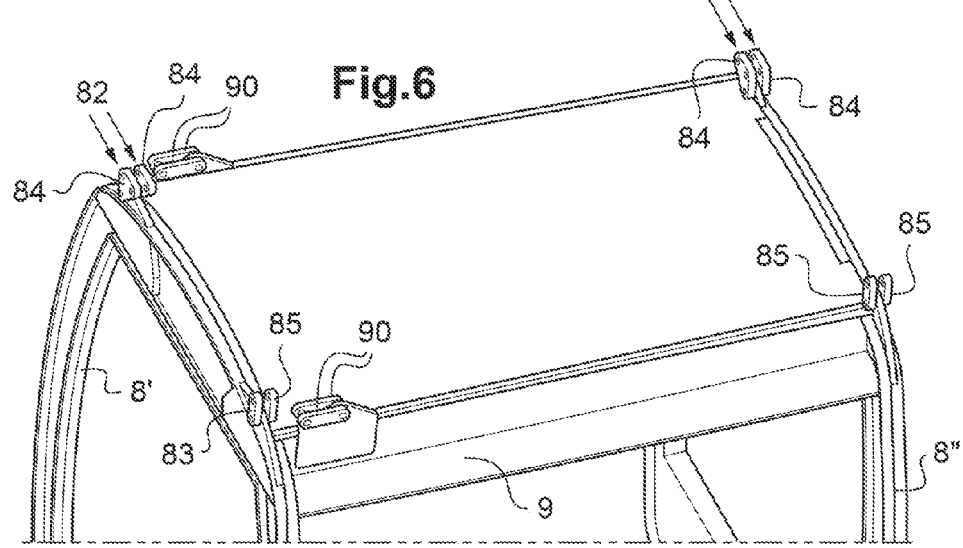
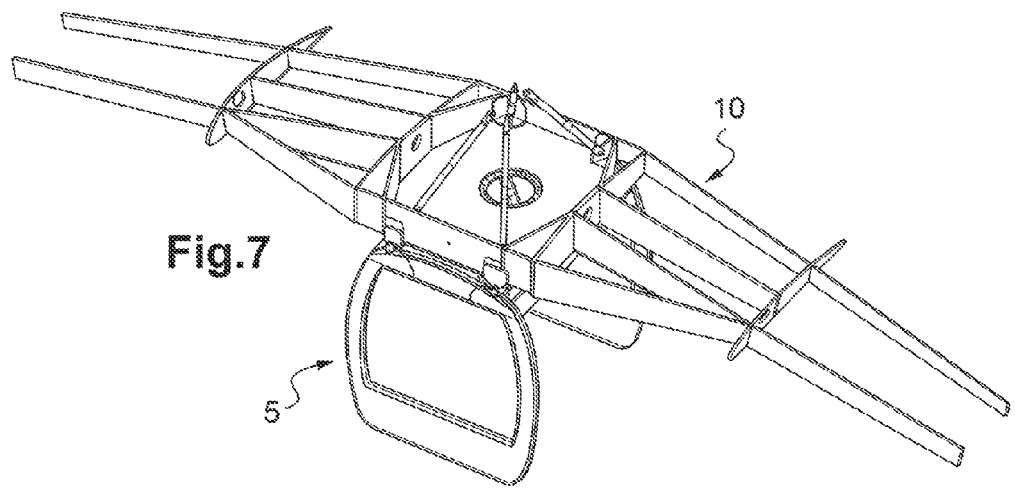

REMOVABLE LIFT ASSEMBLY FOR A ROTORCRAFT, AND A ROTORCRAFT

CROSS REFERENCE TO RELATED APPLICATION

This application claims priority to French patent application No. FR 14 00836 filed on Apr. 7, 2014, the disclosure of which is incorporated in its entirety by reference herein.

BACKGROUND OF THE INVENTION (1) Field of the Invention

The present invention relates to a removable lift assembly for a rotorcraft and to a rotorcraft including such a lift assembly.

(2) Description of Related Art

A rotorcraft has at least one rotor, sometimes referred to as its "main rotor", that provides the rotorcraft with at least some of its lift, and possibly also with its propulsion.

Such a main rotor may be set into rotation by a power plant comprising at least one engine and a main gearbox (mgb). The main gearbox is connected to a hub of the main rotor by a rotor mast and to at least one engine by a power drive train.

The engine thus sets the main gearbox into motion and the main gearbox drives rotation of the main rotor.

The main gearbox and the engine of a power plant are supported by a floor of the aircraft sometimes referred to as a "transmission support platform".

For example, the main gearbox comprises a casing extending in elevation from a bottom to a top.

The top may be connected to the transmission support platform via at least three bars sometimes referred to as "suspension bars".

Furthermore, a suspension system may extend between the transmission support platform and the bottom of the main gearbox.

Such a suspension system may comprise a bar extending between two ends. A laminated damper is arranged between each end of the bar and the main gearbox. In addition, a laminated damper is arranged between each of the bars and the transmission support platform.

The bar shape explains why such a suspension system is sometimes referred to as a "dog-bone" suspension system ("os a chien" in French language).

Document FR 1 507 306 describes another suspension system that has a plate with slots. That particular shape explains why that suspension system is sometimes referred to as a "barbecue" suspension system.

The transmission support platform might be located above the master cross-section of the fuselage of the rotorcraft, which tends to degrade the drag of the rotorcraft.

The transmission support platform might alternatively be incorporated at least in part with the master cross-section in order to minimize the drag of the rotorcraft. Nevertheless, such an arrangement reduces the ground clearance of the blades of the main rotor. On a rotorcraft that is provided both with a rotor and with propellers, it can then be difficult to arrange the propellers under the main rotor for the purpose of contributing in particular to propelling the rotorcraft and/or to controlling yaw movement of the rotorcraft.

A rotorcraft may have a rotor as well as propellers arranged on a wing in order to reach high forward speed. Nevertheless, it can be understood that the presence of a wing carrying propellers can be constraining in terms of overall size, for example when the rotorcraft is transported on board a ship.

By way of example, document us 2002/0011539 describes a rotorcraft having a main rotor and two propellers. The two propellers are fastened respectively to the trailing edges of two half-wings extending transversely on either side of the fuselage.

The rotor mast is then very long in order to avoid contact between the blades of the main rotor and the blades of the propellers. Such an arrangement can have a negative impact on the drag generated by the rotorcraft in forward flight.

Furthermore, a wing is usually fastened to the fuselage in non-removable manner.

Document us 2011/0266398 describes a system for fastening a wing to a fuselage, the fastener system being provided with a plurality of fastener means.

Document RU 2 448 866 describes a device for connecting a wing to a fuselage.

Document FR 2 935 351 is remote from the specific technical field of rotorcraft and provides no teaching for this technical field.

Document FR 2 935 351 describes an airplane having a fuselage suspended under a wing carrying a tail assembly and jets. The purpose of that architecture is to improve the situation of transport airplanes relative to problems of centering and setting the wing.

That document therefore does not belong to the technical field of the invention, namely the technical field of rotorcraft having high forward speeds.

Also known are the following documents: EP 2 690 011, GB 895 590, and GB 673 421.

BRIEF SUMMARY OF THE INVENTION

An object of the present invention is thus to propose a lift assembly for such a rotorcraft, and suitable for being of a removable nature.

According to the invention, a lift assembly of a rotorcraft that is for fastening in removable manner to a fuselage of a rotorcraft comprises:

a fixed wing comprising in succession in a transverse direction: a left lift segment a central box for fastening to a fuselage and a right lift segment; said wing having at least two spars extending from the left lift segment to the right lift segment, said wing extending in elevation from a pressure side to a suction side and longitudinally from a leading edge to a trailing edge;

a main gearbox extending in elevation from a bottom towards a top, said main gearbox having a mast for setting in rotation a lift rotor, said main gearbox passing through an opening in the suction side of the central box so that the bottom of said main gearbox is attached to a resilient suspension system arranged at the level of the pressure side of the central box, said top projecting from said central box, said top being fastened to at least one spar by at least three suspension bars; and a reversible fastener system having a plurality of fastener means for reversibly fastening said central box to a plurality of fastener points of a fuselage.

The lift assembly thus presents a complete aircraft module that includes a fixed wing containing a main gearbox suitable for setting a rotary wing into rotation.

The lift assembly may be attached to a fuselage using a reversible fastener system.

Such a lift assembly makes it possible to design a modular rotorcraft, the rotorcraft having one module comprising a fuselage and another module comprising the lift assembly.

This modular design makes it easier to transport the aircraft, in particular by airplane or by boat.

Furthermore, the design can facilitate maintenance of the rotorcraft. In particular, it is possible to remove a lift assembly possessing elements that have failed and to replace it with another lift assembly that has not failed, for example.

Finally, this design can also tend to optimize the time required for assembling a rotorcraft.

The lift assembly may also include one or more of the following characteristics.

Thus, the wing may include for example a leading edge spar and a trailing edge spar. The lift assembly may include at least two front suspension bars each fastened via a fitting to the leading edge spar, and at least two rear suspension bars each fastened via a fitting to the trailing edge spar.

This provision seeks to optimize support of the main gearbox by the wing.

Furthermore, the central box extends, for example, transversely from a left side beam to a right side beam, each side beam extending longitudinally from a leading edge spar to a trailing edge spar, each side beam being secured to a stiffening piece extending between the side beam and one of said leading edge and trailing edge bars so that the central box defines a hollow inside space receiving the bottom of said main gearbox, each of said fittings being fastened to a spar and also to a stiffening piece and to a pressure side panel of the central box.

This architecture makes it possible to obtain a central box that is strong and suitable for supporting the main gearbox in the required position.

In addition, the resilient suspension system may comprise a mount extending longitudinally from a leading edge spar to a trailing edge spar, said resilient suspension system co-operating with resilient suspension means interposed between said mount and said bottom.

Thus, the bottom of the main gearbox is carried by a mount, the mount being secured to two spars so as to form a strong structure that is suitable for carrying the main gearbox.

In a variant, the resilient suspension means comprises a link bar and a support that is fastened to the bottom of the main gearbox, the link bar extending between two ends, a laminated damper being arranged between each end and the support, and also between each end and the mount of the resilient suspension system.

The resilient suspension means can thus be of the "dogbone" type.

In another variant, the resilient suspension means comprise a plate having slots, the plate being connected to the mount and to the bottom of the main gearbox.

The resilient suspension means can thus be of the "barbecue" type.

In addition, the fastener system may include at least a front pair of fastener means secured to a leading edge spar and at least one rear pair of fastener means secured to trailing edge spar, each pair having:

first fastener means for transmitting the forces to which said lift assembly is subjected as a result of movement in translation in elevation, or transversely, or movement in rotation about a longitudinal axis, about a transverse axis, or about an axis in elevation; and second fastener means for transmitting the forces to which said lift assembly is subjected as a result of a movement in translation in elevation, or a movement in rotation about a longitudinal axis, about a transverse axis, or about an axis in elevation.

These pairs of fastener means enable the wing to be secured to a fuselage relative to movement in translation in two directions and to movement in rotation in three directions. Nevertheless, the principle of using such fasteners with ball joints makes it possible to give the wing freedoms to move relative to the fuselage so as to accommodate a small amount of deformation of the wing under the effect of aerodynamic forces or of thermal expansion, for example.

Furthermore, the first fastener means of a pair may comprise a triangular plate having two top orifices for fastening to a spar, and a bottom orifice for fastening to a fuselage, the two top orifices being in alignment with each other along a transverse direction, one of the top orifices being vertically above a bottom orifice, and each orifice co-operating with a ball joint.

The second fastener means may comprise a link in elevation having a top hole for fastening it to a spar, and a bottom hole for fastening it to a fuselage, the top hole being vertically above the bottom hole, and each hole co-operating with a ball joint.

The fastener means of a pair are optionally arranged in a common plane.

In addition, said fastener system may include at least two longitudinal fasteners, each longitudinal fastener having at least one longitudinal link for transmitting the forces to which said lift assembly is subjected as a result of movement in longitudinal translation, each longitudinal link being provided with a first passage for fastening it to the central box and with a second passage for fastening it to a fuselage, each passage co-operating with a ball joint.

The longitudinal links enable the wing to be secured to a fuselage relative to movements in translation in a longitudinal direction.

Furthermore, the lift assembly may include a rotor secured to said mast.

In particular, the hub of the rotor may be secured to the mast that projects from the main gearbox.

The lift assembly may also include means for controlling the blades of the rotor, such as a swashplate assembly, for example.

Furthermore, the lift assembly may include at least one main transmission shaft that is connected to the main gearbox and that is designed to be set into rotation by an engine.

In order to connect the main gearbox to an engine, it then suffices to fasten the main transmission shaft to the engine.

Furthermore, the lift assembly may include at least one propeller carried by a lift segment of the wing, a secondary drive train connecting the propeller to the main gearbox.

This lift assembly can then be arranged on an aircraft having a high forward speed.

For example, each lift segment may be fitted with a propeller.

Furthermore, the torque generated by the propellers is advantageously taken up by the wing and not by a fuselage.

Furthermore, each lift segment of the wing may include at least one wheel set of landing gear suitable for standing on ground. A wheel set may be provided with at least one wheel.

Such wheel sets improve the stability of a rotorcraft on the ground.

The invention also provides a rotorcraft having a fuselage together with a fixed wing and a lift rotor, the lift rotor being driven in rotation by a main gearbox connected to at least one engine.

The rotorcraft then includes a lift assembly as described above, the lift assembly comprising the wing and the main gearbox and said lift rotor, the lift assembly being fastened to the fuselage in reversible manner by the fastener system.

The lift assembly may be attached to the fuselage by using the above-described reversible fastener system. After such an assembly, the pressure side may be located within the master cross-section of the fuselage so as to minimize the drag of the rotorcraft.

Under such circumstances, the rotorcraft may present low drag.

The rotorcraft may have one or more of the following characteristics.

For example, the rotorcraft may have at least two longitudinal lift beams, the central box being arranged over the lift beams and being fastened to the lift beams by two respective longitudinal links.

The rotorcraft may include at least two lift frames extending in elevation, two spars of the lift assembly being fastened in reversible manner respectively to the two frames, each spar being fastened to a frame by a pair of fastener means.

BRIEF DESCRIPTION OF THE SEVERAL VIEWS OF THE DRAWINGS

The invention and its advantages appear in greater detail from the context of the following description of examples given by way of illustration and with reference to the accompanying figures, in which:

FIG. 1 is an exploded view of a rotorcraft having a lift assembly of the invention;

FIG. 2 is an isometric view showing resilient suspension means;

FIG. 3 is an isometric view showing suspension bars;

FIG. 4 is a diagram showing various members of a lift assembly;

FIG. 5 is a diagram explaining how a lift assembly is fastened to frames of a fuselage;

FIG. 6 is a diagram showing a fuselage suitable for receiving a lift assembly;

FIG. 7 is a diagram showing a lift assembly fastened to a fuselage;

Figure 8:
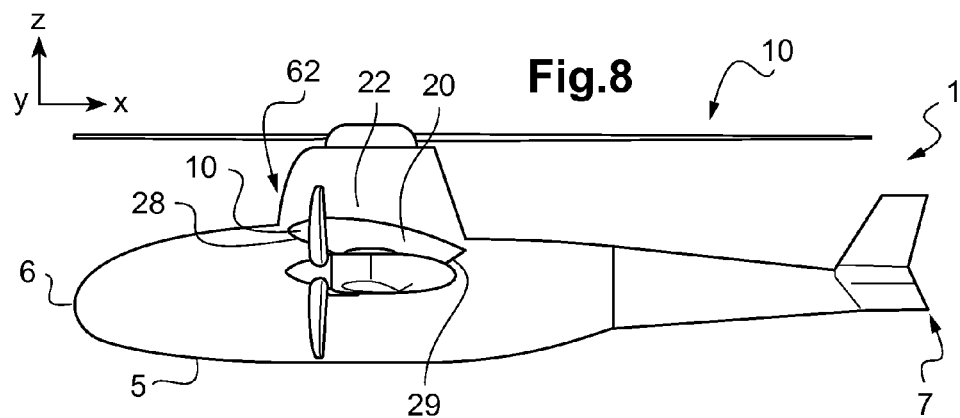
FIG. 8 is a view of a rotorcraft in a first variant.

Elements shown in more than one of the figures are given the same references in each of them.

DETAILED DESCRIPTION OF THE INVENTION

It should be observed that three mutually orthogonal directions x, y, and z are shown in some of the figures.

The first direction x is said to be longitudinal. The term "longitudinal" relates to any direction parallel to the first direction x.

The second direction y is said to be transverse. The term "transverse" relates to any direction parallel to the second direction y.

Finally, the third direction z is said to be in elevation. The term "in elevation" relates to any direction parallel to the third direction z.

FIG. 1 shows an exploded view of a rotorcraft 1.

The rotorcraft 1 comprises a fuselage 5 extending longitudinally from a nose 6 to a tail end 7 carrying tail fins and/or stabilizers.

Furthermore, the rotorcraft 1 has a lift assembly 10 suitable for being reversibly fastened to the fuselage 5.

The lift assembly includes a wing and a rotor 35 capable of providing the rotorcraft 1 with at least part of its lift and/or propulsion. The wing is said to be "fixed" in contrast to the rotor, which performs motion that is essentially rotary.

The wing then extends between two free ends in a transverse direction. More precisely, the wing has in succession along said transverse direction: a left lift segment 21, a central box 22 for fastening to the fuselage 5, and a right lift segment 23 ("left" and "right" being relative to the figure).

The wing 20 also extends in elevation from a pressure side 26 to a suction side 27, and longitudinally from a leading edge 28 to a trailing edge 29.

In addition, the wing 20 has at least two spars (not shown in FIG. 1) that extend from the left lift segment 21 to the right lift segment 23. For example, the wing has a spar situated at its leading edge and referred to for convenience as the "leading edge spar", and a spar situated at its trailing edge and referred to for convenience as the "trailing edge spar".

In order to set a rotor 35 into motion, the lift assembly 10 includes a main gearbox 30 arranged in part in the wing 20, and also projecting in part from the wing 20.

The main gearbox 30 extends in elevation from a bottom 31 located in the central box 22 towards a top 32 projecting in elevation from the central box 22. A mast 33 projects from the top 22 in order to be secured to a hub 36 carrying a plurality of blades 37. The main gearbox 30 thus drives the rotor 35 in rotation via the mast 33.

In order to attach the main gearbox 30 to the wing 20, the lift assembly 10 includes a plurality of suspension bars 70 and a resilient suspension system 50.

Under such circumstances, the suspension system 50 is interposed between the pressure side of the central box 22 of the wing 20 and the bottom 31 of the main gearbox 30.

FIG. 2 shows such a suspension system 50.

In FIG. 2, the central box 22 is defined longitudinally by a leading edge spar 24 and by a trailing edge spar 25, transversely by a left side beam 74 and by a right side beam 75, and in elevation by a pressure side panel 200 including an opening. It should be observed that ribs of the lift segment may extend from the side beams.

In contrast, the central box is open on the suction side of the wing so that the main gearbox 30 can pass therethrough. The central box thus includes an opening 40.

In addition, the central box 22 defines a hollow inside space. This central box 22 may include stiffening pieces 76 giving this inside space the shape of a prism with an octagonal base.

The central box may have four stiffening pieces 76. Each stiffening piece 76 then extends between a side beam and a spar. As a result:

a first stiffening piece is fastened to the left side beam and to the leading edge spar;

a second stiffening piece is fastened to the left side beam and to the trailing edge spar;

a third stiffening piece is fastened to the right side beam and to the leading edge spar; and a fourth stiffening piece is fastened to the right side beam and to the trailing edge spar.

Under such circumstances, the resilient suspension system 50 has a mount 51.

On the pressure side, this mount 51 may extend below the pressure side panel 200. This mount is suitable for carrying fastener means for fastening the lift assembly to the fuselage.

Specifically, the mount 51 may have two longitudinal beams 52 extending longitudinally from the leading edge spar 24 to the trailing edge spar 25, and two transverse beams 54 extending transversely between the longitudinal beams 52.

In addition, the resilient suspension system 50 includes resilient suspension means 55 facing the opening in the pressure side panel. The resilient suspension means 55 are thus interposed between the mount 51 and the bottom 31 of the main gearbox.

In the variant of FIG. 2, the resilient suspension means 55 are of the "dog-bone" type. Thus, the resilient suspension means 55 comprise a link bar 56 and a support 59 that is fastened to the bottom 31 of the main gearbox. Consequently, the link bar 56 extends between two ends 57. A laminated damper 58 is then arranged between each end 57 and the support 59, and also between each end 57 and the mount 51.

Nevertheless, the suspension means could also be of the "barbecue" type, having a flexible plate provided with slots. The plate is then connected to the mount 51 and to the bottom 31 of the main gearbox 30.

With reference to FIG. 1, the lift assembly 10 also has a plurality of suspension bars 70. Each suspension bar serves to connect the top 32 of the main gearbox 30 to the wing 20.

With reference to FIG. 3, each suspension bar 70 may be fastened by a fitting 73 to a spar, and possibly also to a stiffening piece 76 and to a pressure side panel.

Thus, each fitting may have a horizontal pressure side face secured to the pressure side panel, a first face in elevation secured to a stiffening piece 76, a second face in elevation secured to a spar, and a third face in elevation connected directly or indirectly to a suspension bar 70.

For example, two front suspension bars 71 are fastened by respective fittings 73 to the leading edge spar 24 and at least two rear suspension bars 72 are fastened by respective fittings 73 to the trailing edge spar 25.

With reference to FIG. 4, the lift assembly may include at least one propeller 62 carried by a lift segment of the wing. For example, two propellers 62 may be carried respectively by the left lift segment 21 and by the right lift segment 23.

At least one propeller may be arranged at the trailing edge of the wing as drawn in continuous lines, or at the leading edge of the wing, as drawn in dashed lines.

Under such circumstances, the lift assembly may include at least one main transmission shaft 60 connected to the main gearbox 30. Each main transmission shaft may project from the wing, and advantageously from its trailing edge, in order to be secured to an engine 61 secured to the fuselage of the rotorcraft.

Furthermore, the main gearbox 30 may drive each propeller via a secondary drive train 620 connecting each propeller 62 to the main gearbox 30. For example, each secondary drive train 620 passes through a side beam 74, 75 of the central box 22 in order to reach the main gearbox 30.

With reference to FIG. 1, the lift assembly may also include at least one landing-gear wheel set 65.

For example, each lift segment 21, 23 of the wing 20 includes at least one wheel set 65.

Furthermore, the lift assembly is provided with a fastener system 80 for fastening the lift assembly 10 reversibly to the fuselage 5.

Such a fastener system 80 is provided with a plurality of fastener means 81 for fastening the central box 22 to a plurality of fastener points 100 of a fuselage 5, e.g. via ball joints.

With reference to FIG. 3, the fastener system 80 may for example possesses two pairs of fastener means 81, the pairs being fastened to respective spars.

Thus, a front pair 82 of fastener means 81 is secured to a leading edge spar 24 and a rear pair 83 of fastener means is fastened to a trailing edge spar 25.

Each pair includes first fastener means 84 for transmitting to the fuselage those forces to which the lift assembly is subjected as a result of moving in translation in elevation or transversely, or in rotation about a longitudinal axis, about a transverse axis, or about an elevation axis.

These first fastener means 84 may for example be provided with a triangular plate.

The triangular plate thus has two top orifices 86, each connected to the same spar via a ball joint. The two top orifices 86 are in alignment with each other along a transverse direction.

The triangular plate also has a bottom orifice 87 fastened to a fastener point of a lift frame 8 of a fuselage 5, e.g. via a ball joint. One of the top orifices 86 is vertically above a bottom orifice 87 in an elevation direction referred to as the "fastening direction in elevation".

Furthermore, each pair of fastener means comprises second fastener means 85 for transmitting to the fuselage those forces to which the lift assembly is subjected as a result of moving in translation in elevation, or in rotation about a longitudinal axis, about a transverse axis, or about an axis in elevation.

The second fastener means 85 comprises a link extending in elevation having a top hole 88 for fastening to a spar via a ball joint, for example. The link in elevation also has a bottom hole 89 for fastening to a fastener point of a lift frame 8 of a fuselage 5, for example. The top hole 88 is vertically above the bottom hole 89 in a direction in elevation parallel to the fastening direction in elevation.

With reference to FIG. 5, the fastener means 81 in a pair are arranged in a common plane p1, p2, the plane extending in a direction in elevation and in a transverse direction.

In addition, the fastener system 80 may have two longitudinal fasteners, each longitudinal fastener comprising at least one longitudinal link 90 for transmitting to the fuselage those forces to which the lift assembly is subjected as a result of moving longitudinally in translation.

Each longitudinal link has a first passage 91 for fastening to the central box, e.g. via a ball joint. The first passage may be connected to a fitting of a mount carrying the suspension system of the main gearbox.

Furthermore, each longitudinal link is provided with a second passage 2 for fastening to a fastener point of a lift beam 9 of a fuselage 5, e.g. via a ball joint. Such a lift beam may connect together two lift frames 8. Under such circumstances, the pressure side of the central box may rest on the tops of these lift beams.

With reference to FIG. 6, the aircraft may have two front pairs 82 of fastener means 81.

Under such circumstances, two first front fastener means 84 may have between them a fitting of a front frame 8' of the fuselage and a fitting of a front spar of the wing.

Furthermore, two first rear fastener means 84 may have between them a fitting of a rear frame 8" of the fuselage and a fitting of a rear spar of the wing.

Furthermore, two second front fastener means 85 may have between them a fitting of a front frame 8' of the fuselage and a fitting of a front spar of the wing.

With reference to FIG. 6, two second rear fastener means 85 may have between them a fitting of a rear frame 8" of the fuselage and a fitting of a rear spar of the wing.

Furthermore, each longitudinal fastener may comprise two longitudinal links 90.

FIG. 7 shows a lift assembly fastened in this way to the fuselage 5. More precisely, FIG. 7 shows part of the lift assembly and part of the fuselage in order to avoid overcrowding this FIG. 7, and in order to show some of the fastener means.

FIG. 8 is a view of a first variant of a rotorcraft.

In this first variant, the central box is not contained in the master cross-section of the fuselage.

The pressure side of the central box forming a mechanical floor is thus situated above the fuselage.

FIG. 8 also shows the presence of cowlings on the lift assembly.

Figure 9:
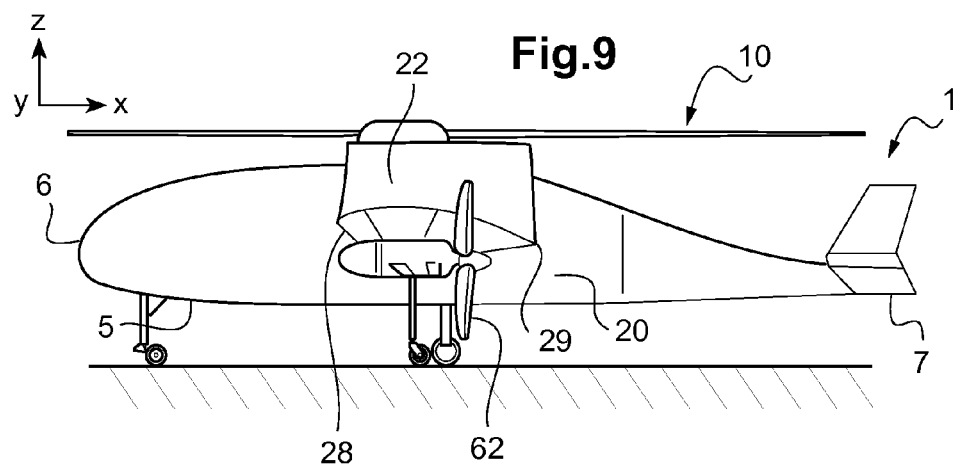
FIGS. 9 and 10 are views of a rotorcraft in a second variant.
Figure 10:
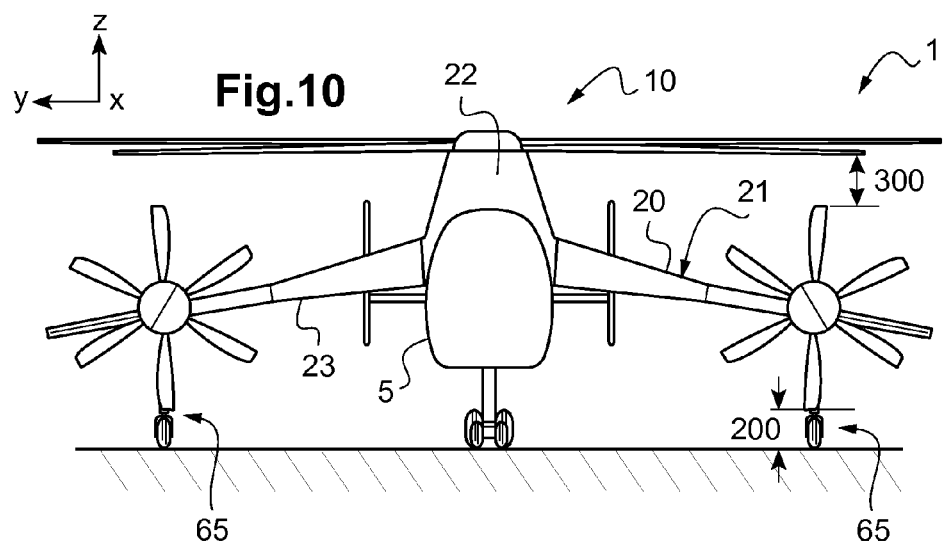

FIGS. 9 and 10 are views of a rotorcraft in a second variant.

In this second variant, the central box is contained in the master cross-section of the fuselage in order to minimize the drag of the rotorcraft. Under such circumstances, the main gearbox, the engines, and the central box of the fixed wing are installed substantially within the geometrical envelope defined by the fuselage, thereby making it possible to minimize the master cross-section of the engine covers.

Independently of the variant, the landing gear of the rotorcraft may be dimensioned so as to guarantee acceptable ground clearance 200 between the propellers and the ground, and an acceptable rotor clearance 300 between the rotor and the propellers.

Thus, the main rotor is advantageously installed as close as possible to the ground, while complying with the constraints of rotor clearance and of ground clearance, in order to optimize the drag of the rotorcraft.

The landing gear may include the wheel sets of the lift assembly, together with conventional means carrying the fuselage. These wheel sets are advantageously arranged, where appropriate, under nacelles for the propellers of the lift assembly.

For example, providing the fuselage with tricycle landing gear and providing two wheel sets under the wing serves to impart great lateral stability to the rotorcraft, and possibly to make the floor of cabin available for emergency operations.

The landing gear could also comprise tandem landing gear arranged under the fuselage, i.e. landing gear with a front wheel set and a main wheel set that are in alignment.

Whatever the variant, the rotorcraft is then laterally stable on the ground, and can land on sloping ground in a crosswind.

Furthermore, the propulsive propellers are installed on the wing, e.g. in order to control yaw movement of the rotorcraft and to participate in propelling the rotorcraft.

The positions of the propellers may be determined so as to facilitate winching operations and access to the sides of a cabin when on the ground. In particular, arranging a propeller at the trailing edge of the wing appears to be well adapted to satisfying this need.

This position at the rear of a wing also serves to avoid the stream of air from the propellers disturbing the flow of air around the wing, thereby reducing the drag of the wing.

In addition, the noise radiated by the propellers to the cabin can be reduced. Furthermore, the cabin may be out of the way of projected ice and/or debris coming from the propellers.

Furthermore, such a rotorcraft may present good performance during hovering flight, insofar as the main rotor can thus be of large diameter.

In addition, the architecture of the rotorcraft appears to be less complex than rotorcraft having tilting rotors, for example, and that can help limit the cost of the rotorcraft.

Naturally, the present invention may be subjected to numerous variations as to its implementation. Although several embodiments are described, it will readily be understood that it is not conceivable to identify exhaustively all possible embodiments. It is naturally possible to envisage any of the means described by equivalent means without going beyond the ambit of the present invention.

What is claimed is:

1. A lift assembly for a rotorcraft, the lift assembly configured to fasten in removable manner to a fuselage of a rotorcraft and comprising:
   a fixed wing comprising in succession in a transverse direction: a left lift segment; a central box for fastening to the fuselage; and a right lift segment; the wing having at least two spars extending from the left lift segment to the right lift segment, the wing extending in elevation from a pressure side to a suction side and longitudinally from a leading edge to a trailing edge;
   a main gearbox extending in elevation from a bottom towards a top, the main gearbox having a mast for setting in rotation a lift rotor, the main gearbox passing through an opening in the suction side of the central box so that the bottom of the main gearbox is attached to a resilient suspension system arranged at the level of the pressure side of the central box, wherein the top projects from the central box and is fastened to at least one of the at least two spars by at least three suspension bars; and
   a reversible fastener system having a plurality of fastener means for reversibly fastening the central box to a plurality of fastener points of the fuselage;
   wherein the at least two spars include a leading edge spar and a trailing edge spar, each of the at least three suspension bars is fastened via a fitting to the leading edge spar or the trailing edge spar, the central box extends transversely from a left side beam to a right side beam, each side beam extends longitudinally from the leading edge spar to the trailing edge spar, and each side beam is secured to a stiffening piece extending between the side beam and one of the leading edge and trailing edge spars so that the central box defines a hollow inside space that receives the bottom of the main gearbox.

2. The lift assembly according to claim 1, wherein the at least three suspension bars include at least two front suspension bars each fastened via a fitting to the leading edge spar, and at least two rear suspension bars each fastened via a fitting to the trailing edge spar.

3. The lift assembly according to claim 2, wherein each of the fittings is fastened to a stiffening piece and to a pressure side panel of the central box.

4. The lift assembly according to claim 1, wherein the resilient suspension system comprises a mount extending longitudinally from the leading edge spar to the trailing edge spar, and resilient suspension means interposed between the mount and the bottom of the main gearbox.

5. The lift assembly according to claim 4, wherein the resilient suspension means comprises a link bar and a support that is fastened to the bottom of the main gearbox, the link bar extending between two ends, and wherein a laminated damper is arranged between each end and the support and between each end and the mount.

6. The lift assembly according to claim 1, wherein the fastener system includes at least a front pair of fastener means secured to the leading edge spar and at least one rear pair of fastener means secured to the trailing edge spar, each pair having:
first fastener means for transmitting forces to which the lift assembly is subjected as a result of movement in translation in elevation, or transversely, or movement in rotation about a longitudinal axis, about a transverse axis, or about an axis in elevation; and
second fastener means for transmitting forces to which the lift assembly is subjected as a result of a movement in translation in elevation, or a movement in rotation about a longitudinal axis, about a transverse axis, or about an axis in elevation.

7. The lift assembly according to claim 6, wherein the first fastener means of a pair comprises a triangular plate having two top orifices for fastening to the trailing edge spar or the leading edge spar, and a bottom orifice for fastening to the fuselage, the two top orifices are in alignment with each other along a transverse direction, one of the two top orifices is vertically above the bottom orifice, and each orifice is configured to cooperate with a ball joint.

8. The lift assembly according to claim 6, wherein each second fastener means comprises a link in elevation having a top hole for fastening the second fastener means to the trailing edge spar or the leading edge spar, and a bottom hole for fastening the second fastener means to the fuselage, wherein the top hole is vertically above the bottom hole, and each hole is configured to cooperate with a ball joint.

9. The lift assembly according to claim 6, wherein the fastener means of a pair are arranged in a common plane.

10. The lift assembly according to claim 6, wherein the fastener system includes at least two longitudinal fasteners, each longitudinal fastener having at least one longitudinal link for transmitting the forces to which the lift assembly is subjected as a result of movement in longitudinal translation, each longitudinal link is provided with a first passage for fastening the longitudinal link to the central box and with a second passage for fastening the longitudinal link to the fuselage, and each passage is configured to cooperate with a ball joint.

11. The lift assembly according to claim 1, wherein the lift assembly includes a rotor secured to the mast.

12. The lift assembly according to claim 1, wherein the lift assembly includes at least one main transmission shaft that is connected to the main gearbox and that is rotatable by an engine.

13. The lift assembly according to claim 1, wherein the lift assembly includes at least one propeller carried by a lift segment of the wing, a secondary drive train connecting the propeller to the main gearbox.

14. The lift assembly according to claim 1, wherein each lift segment of the wing includes at least one wheel set of a landing gear suitable for standing on ground.

15. A rotorcraft comprising:
a fuselage; and
a lift assembly including:
a fixed wing comprising in succession in a transverse direction: a left lift segment, a central box fastened to the fuselage, and a right lift segment, the wing having at least two spars extending from the left lift segment to the right lift segment, the wing extending in elevation from a pressure side to a suction side and longitudinally from a leading edge to a trailing edge;
a lift rotor;
a main gearbox extending in elevation from a bottom towards a top, the main gearbox having a mast for setting in rotation the lift rotor, the main gearbox passing through an opening in the suction side of the central box so that the bottom of the main gearbox is attached to a resilient suspension system arranged at the level of the pressure side of the central box, wherein the top projects from the central box and is fastened to at least one of the at least two spars by at least three suspension bars; and
a fastener system having a plurality of fastener means for fastening the central box to a plurality of fastener points of the fuselage;
wherein the at least two spars include a leading edge spar and a trailing edge spar, each of the at least three suspension bars is fastened via a fitting to the leading edge spar or the trailing edge spar, the central box extends transversely from a left side beam to a right side beam, each side beam extends longitudinally from the leading edge spar to the trailing edge spar, and each side beam is secured to a stiffening piece extending between the side beam and one of the leading edge and trailing edge spars so that the central box defines a hollow inside space that receives the bottom of the main gearbox.

16. The rotorcraft according to claim 15, wherein the rotorcraft has at least two longitudinal lift beams, the central box is arranged over the at least two longitudinal lift beams and is fastened to the lift beams by two respective longitudinal links.

17. The rotorcraft according to claim 15, wherein the rotorcraft includes at least two lift frames extending in elevation, two spars of the lift assembly are fastened in reversible manner respectively to the two lift frames, and each spar is fastened to a lift frame by a pair of fastener means.

18. A lift assembly for a rotorcraft, the lift assembly configured to fasten in removable manner to a fuselage of a rotorcraft and comprising:
a fixed wing comprising in succession in a transverse direction: a left lift segment, a central box, and a right lift segment, the wing having a leading edge spar and a trailing edge spar that each extend from the left lift segment to the right lift segment, the wing extending in elevation from a pressure side to a suction side and longitudinally from a leading edge to a trailing edge;
a main gearbox extending in elevation from a bottom towards a top, the main gearbox having a mast for setting in rotation a lift rotor, the main gearbox passing through an opening in the suction side of the central box so that the bottom of the main gearbox is attached to a resilient suspension system arranged at the level of the pressure side of the central box, wherein the top projects from the central box and is fastened to the wing by two front suspension bars and two rear suspension bars; and
a fastener system configured to removably fasten the central box to a plurality of fastener points of the fuselage;
wherein each front suspension bar is fastened via a fitting to the leading edge spar, and each rear suspension bar is fastened via a fitting to the trailing edge spar, wherein the central box extends transversely from a left side beam to a right side beam, each side beam extending longitudinally from the leading edge spar to the trailing edge spar, and wherein each side beam is secured to a stiffening piece extending between the side beam and one of the leading edge and trailing edge spars so that the central box defines a hollow inside space that receives the bottom of the main gearbox.

19. The lift assembly according to claim 18 wherein the resilient suspension system comprises a mount extending longitudinally from the leading edge spar to the trailing edge spar, and resilient suspension means interposed between the mount and the bottom of the main gearbox.

20. The lift assembly according to claim 19 wherein the resilient suspension means comprises a link bar and a support that is fastened to the bottom of the main gearbox, the link bar extending between two ends, and wherein a laminated damper is arranged between each end and the support and between each end and the mount.

* * * * *